United States Patent [19]

Walker

[11] Patent Number: 4,491,346

[45] Date of Patent: Jan. 1, 1985

[54] APPARATUS FOR RELEASABLY CONNECTING TUBULAR MEMBERS IN END-TO-END RELATION

[75] Inventor: James M. Walker, Houston, Tex.

[73] Assignee: Dril-Quip, Inc., Houston, Tex.

[21] Appl. No.: 438,575

[22] Filed: Nov. 1, 1982

[51] Int. Cl.³ .................... F16L 55/00; F16L 37/18; F16L 39/00

[52] U.S. Cl. .................... 285/18; 285/315; 285/321; 285/398; 285/419

[58] Field of Search ........... 285/18, 315, 398, 321, 285/419, 373

[56] References Cited

U.S. PATENT DOCUMENTS

| 3,675,713 | 7/1972 | Watkins | 285/18 X |
| 4,114,928 | 9/1978 | Lochte | 285/18 |
| 4,169,507 | 10/1979 | Szymczak | 285/315 X |

FOREIGN PATENT DOCUMENTS 2101522  2/1983  United Kingdom .
2104170  3/1983  United Kingdom .

OTHER PUBLICATIONS

Composite Catalog of Oilfield Equipment and Services, 1980–1981, pp. 1469, 7206.

Primary Examiner—Richard J. Scanlan, Jr.
Attorney, Agent, or Firm—Vaden, Eickenroht, Thompson, Bednar & Jamison

[57] ABSTRACT

There is disclosed apparatus for releasably connecting first and second tubular members in end-to-end relation including a split lock ring having first and second axially spaced locking teeth which are carried by the first member for radial movement together being expanded positions opposite from first and second locking grooves about the first and second members, respectively, and contracted positions in locking engagement with such grooves, and a cam ring which surrounds the lock ring for movement between a first position in which the lock ring is expanded and a second position in which the cam ring is slidable over follower means on the lock ring to wedge said lock ring into expanded position.

59 Claims, 7 Drawing Figures

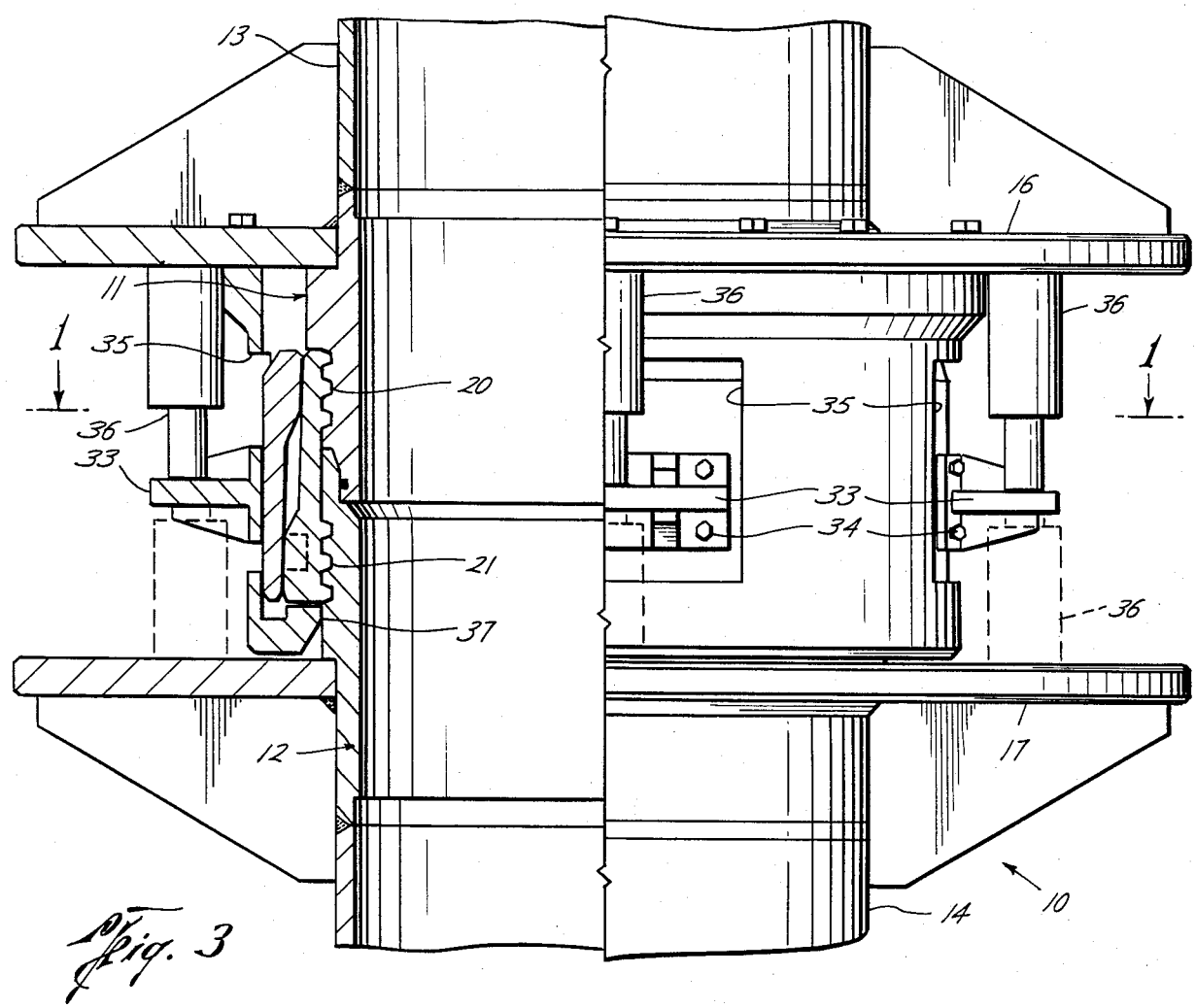
Fig. 3
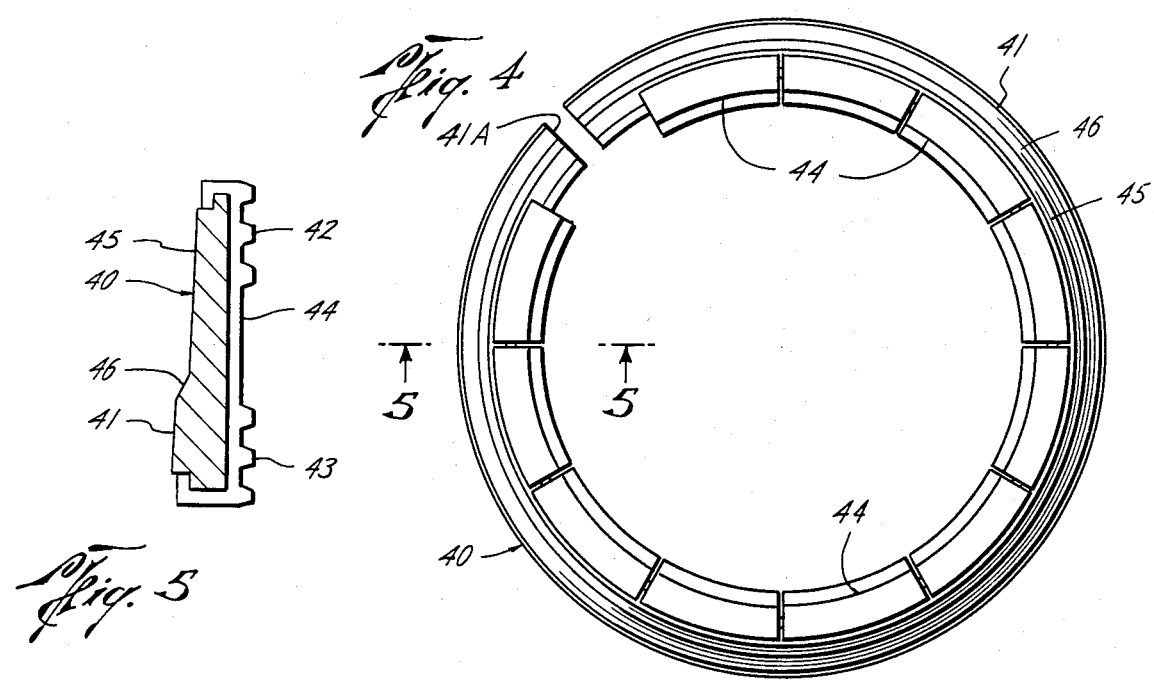
Fig. 4
Fig. 5

APPARATUS FOR RELEASABLY CONNECTING TUBULAR MEMBERS IN END-TO-END RELATION

This invention relates in general to apparatus for releasably connecting tubular members in end-to-end relation; and, more particularly, to improvements in apparatus of this type in which end surfaces on the members are urged into tight engagement with one another in order to preload the connection as it is made up. In one of its aspects, this invention relates to such apparatus which is especially well suited for releasably connecting the ends of riser pipes.

This application is related to my copending application, Ser. No. 438,601 filed concurrently herewith, and entitled "Subsea Wellhead Connectors".

In the drilling or producing of an offshore well from a floating vessel, a riser extends between the vessel and the head of the well. This riser may be as long as several thousand feet, and is made up of successive riser pipes whose adjacent ends are connected on board the vessel, as the riser is lowered into position, or disconnected on board the vessel as the riser is raised. In any event, these connections must be easily and quickly made up or released, as the case may be. Still further, since the ends of pipe sections of the choke and/or kill line extending along the outside of the riser must be telescopically made up at the same time, the riser pipes must be connected without relative rotation of the riser pipes.

A prior connector of this general type includes tubular members adapted to be connected to the ends of the riser pipes, with one such member having a pin thereon for stabbing into a box of the other. Dogs carried by the box member are moved inwardly to slide over a tapered shoulder on the pin member to force the end of the pin into tight engagement with the end of the box. Each dog is so moved by means of an individual screw adapted to extend through a window in the box member. As will be understood, a connection of this type not only requires a large number of parts, and thus frequent field maintenance, but also transmits load through a complex path.

An object of this invention is to provide a preloaded connector of this type, and particularly a riser pipe connector, which is easily and quickly made up, as the case may be, and comprised of a minimum number of parts which transmit load from one tubular member or riser pipe to the other through a single locking part connected directly to each of the tubular members or riser pipes.

A still more particular object is to provide such a connection, and particularly a riser pipe connection, which is especially well suited for being made up or broken out aboard a vessel with a minimum of auxiliary equipment.

A still further object is to provide such a connector which is adapted to be moved to its locked or its unlocked position in response to fluid under pressure, but which will remain in such position when the pressure fluid is exhausted.

These and other objects are accomplished in accordance with the illustrated embodiment of the invention, by a connector of the type described wherein first and second tubular members adapted to be connected to the ends of riser pipes are provided with first and second locking grooves, respectively, and a split lock ring having first and second locking teeth is carried by the first such member for moving the teeth radially together between expanded positions in which the first teeth are generally opposite the first grooves and the second teeth may be moved past the end of the tubular member for disposal opposite the second grooves, when such members are moved into end-to-end relation, and contracted positions in which the first and second teeth are interlocked with the first and second grooves, respectively. More particularly, the teeth have tapered surfaces thereon which are slidable over tapered surfaces of the grooves to urge the end surfaces of tubular members into tight engagement with one another as the lock ring moves to contracted position, and a cam ring is arranged about the lock ring for movement between a first position in which the lock ring is expanded and a second position in which the cam ring is slidable over follower means on the lock ring to wedge said lock ring into locking position.

In one illustrated embodiment of the invention, the lock ring assumes its expanded position when unstressed, and, when so expanded, supports the cam ring in its first position, and the cam ring is slidable over the follower means on the lock ring as the cam ring moves from its first to its second position. More particularly, a dog is so mounted on the cam ring as to enter the split between the ends of the lock ring to spread them apart as the cam ring moves into its first position. Preferably the dog and lock ring have detent means engageable to releasably hold the dog in position between the split.

In another embodiment of the invention, the lock ring assumes its contracted position when unstressed, and the cam ring has means thereon for expanding the lock ring and holding it an expanded position as the cam ring moves to its first position. More particularly, the means for so expanding and holding the lock ring comprises a dog which, as in the first-described embodiment, is so arranged as to enter the split between the ends of the lock ring in order to spread them apart. As was also the case in the first-mentioned embodiment, the dog and lock ring have detent means engageable to hold the dog in position between the split, and thus prevent accidental dislodgement of the dog which would permit the lock ring to contract. Thus, each of the two embodiments is made up of basically the same components, except for the body lock ring, which may be interchangeable between the two embodiments, depending on the shape which it is made to assume when unstressed.

Preferably, the follower means and cam are tapered at an angle which is less than the friction angle of the surfaces of the cam ring and lock ring, so that the cam ring normally holds the locking means in stressed condition, which, in the first-described embodiment of the invention, is its contracted position. On the other hand, in the other embodiment, the lock ring is held in its stressed, expanded position by the disposal of the dog on the cam ring between the split ends of the lock ring. Thus, in either case, the lock ring will remain in the position to which it has been moved, so that when the motive force is fluid under pressure, it may be exhausted.

It is also preferred that the follower means and cam include axially successive, radially displaced surfaces, separated by a transition between them, whereby the lock ring can be moved to a maximum radial extent with a minimum of axial movement. In one embodiment of the invention, the locking teeth are formed on the inner surface of the lock ring. In another embodiment, the locking teeth are formed on locking segments or jaws mounted in circumferentially spaced apart relation about the lock ring.

A skirt is carried by the first tubular member or riser pipe to surround the lock ring and the cam ring, and the lock ring is supported for radial movement on an inwardly extending flange of the skirt. Preferably, the inner diameter of the flange is adapted to fit closely about the second tubular member, and the flange has a tapered surface adjacent its inner diameter to guide the skirt over the end of the second member.

First and second bearing plates extend laterally from the first and second tubular members, respectively. and bearing plate means extends laterally from the cam ring intermediate the first and second members. Thus, extendible and retractible, fluid-operated actuators may be alternately arranged between the intermediate bearing plate means and each of the first and second bearing plates in order to selectively move the cam ring between its positions. In the case of a riser pipe connector, the lateral plates on the first and second tubular members serve a further function in that a pipe which is part of a choke and/or kill line extending along the outside of the riser pipe is mounted on each for telescopically interfitting with the pipe mounted on the other, as the members are moved into end-to-end relation.

In the drawings, wherein like reference characters are used throughout to designate like parts:

FIG. 3 is another view of the connector, partly in vertical section and partly in elevation, and showing the cam ring moved to its lower position by actuators disposed between a bearing plate on the upper tubular member and a bearing plate means on the cam ring;

FIG. 4 is a top plan view of a lock ring contracted in accordance with or alternative embodiment of the invention; and FIG. 5 is a cross-sectional view of the locking means of FIG. 4, as seen along broken lines 5—5 of FIG. 4.

Figure 1:
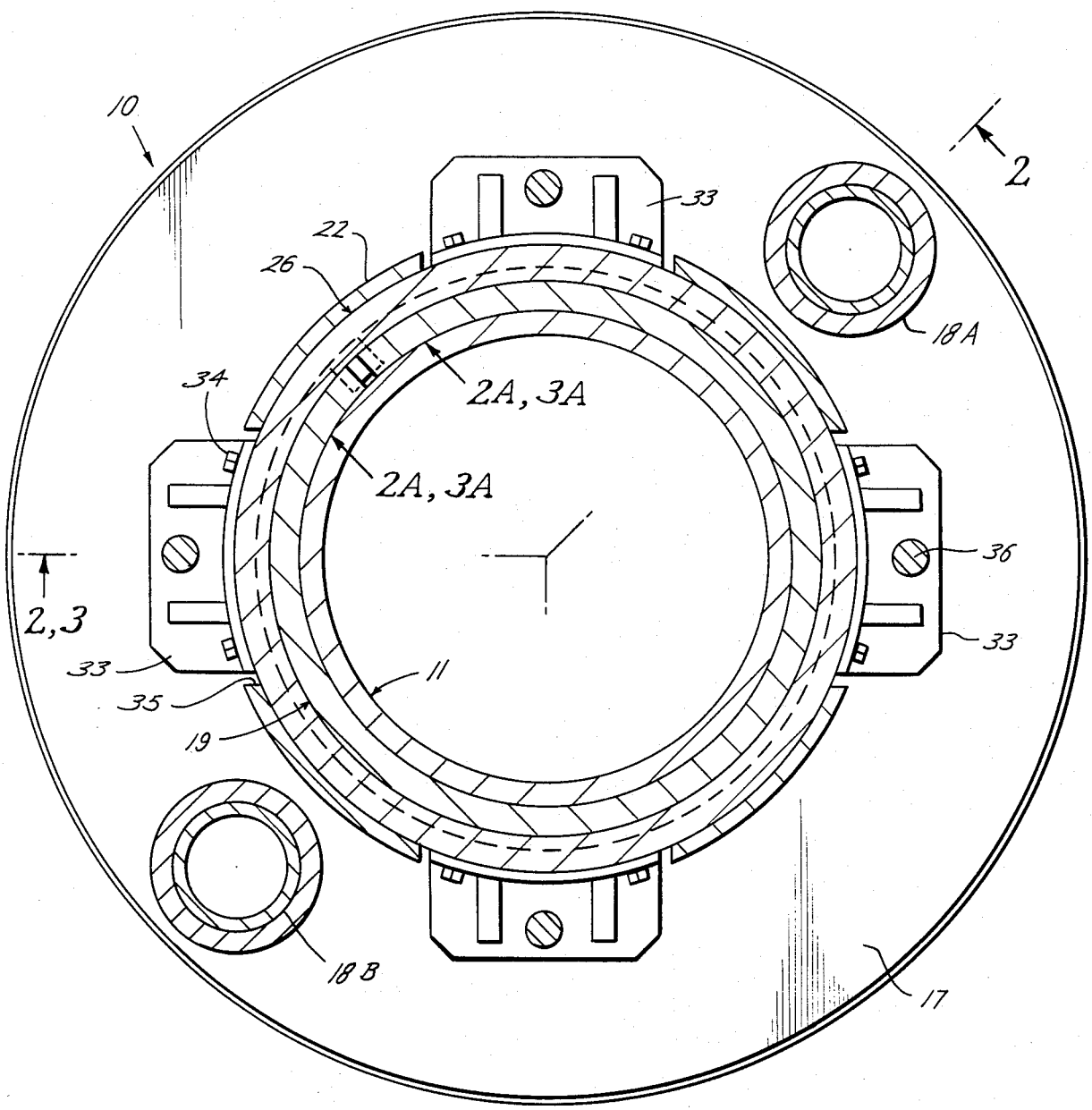
FIG. 1 is a horizontal sectional view of a riser pipe connector constructed in accordance with one embodiment of the present invention, as seen along broken lines 1—1 of FIG. 3.

With reference to the details of the above-described drawings, the connector shown in the drawings, and designated in its entirety by reference character 10, includes first and second, or upper and lower, tubular members 11 and 12, respectively, to be connected, as by welding, to the ends of upper and lower riser pipes 13 and 14, respectively. More particularly, the tubular members 11 and 12 are adapted to be connected in end-to-end relation so as to connect the riser pipes 13 and 14 in coaxial relation.

As shown, the free end of tubular member 11 has a pin 11A formed thereon, while the free end of tubular member 12 has a box 12A formed thereon to receive the pin in telescopic relation. The pin carries a seal ring 15 within a groove about a cylindrical surface thereof to seal with respect to an oppositely facing cylindrical surface of the box 12A when the tubular members are connected. More particularly, the pin and box have conical surfaces 11A and 12A which are slidably engageable with one another, upon movement of the cylindrical sufaces into telescopic relation with one another, as well as flat annular surfaces or shoulders 11B and 12B which are adapted to be urged into tight engagement with one another to preload the connection, as it is made up.

A first plate 16 is connected to the first member 11 for extension laterally thereof, and a second plate 17 is connected to the member 12 to extend laterally thereof. A pair of pipes 18A are mounted in diametrically opposed relation on the plate 16 for telescopically interfitting with pipes 18B mounted on the plate 17, as the tubular members are moved into end-to-end relation. As previously described, one pair of interfitting pipes may connect adjacent sections of a kill line, and the other pair may connect adjacent sections of a choke line, each extending along the sides of the riser pipes. Obviously, there may be additional pairs of interfitting pipes for connecting adjacent sections of other types of fluid lines, or, in other cases, there may be no such pipes at all.

Figure 2:
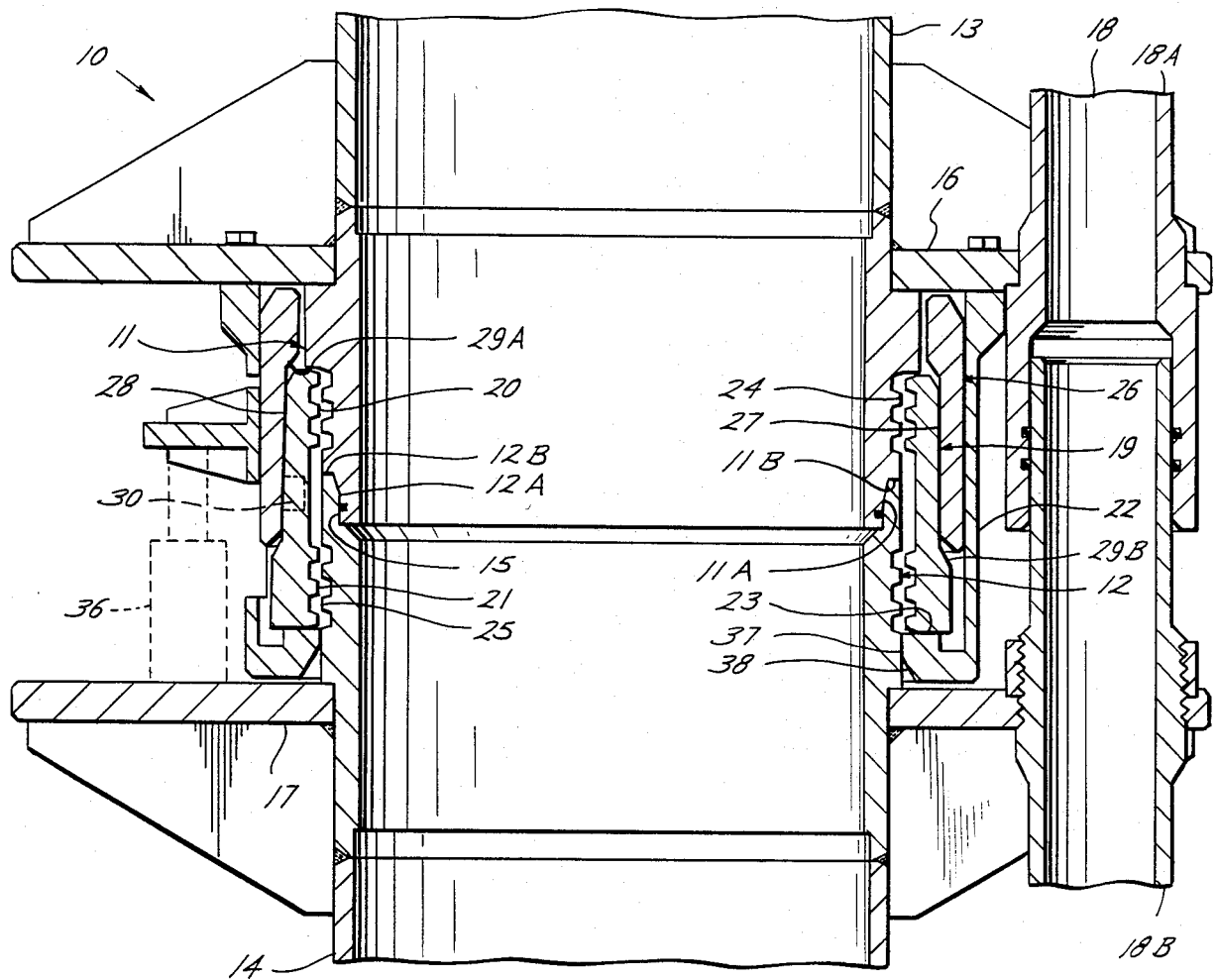
FIG. 2 is a vertical sectional view of the connector of FIG. 1, as seen along broken lines 2—2, and showing the cam ring in its upper position to permit the lock ring to expand into a position in which the upper member may be lowered into or raised from end-to-end relation with the lower member.
Figure 3A:
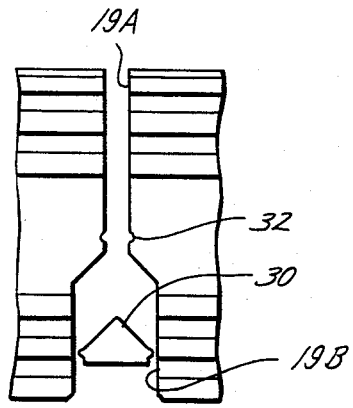
FIGS. 2A and 3A are views of the lock ring and cam ring, as seen along broken lines 2A—2A and 3A—3A, respectively, of FIG. 1, with FIG. 2A showing a dog on the cam ring between the split ends of the lock ring in its expanded position, and FIG. 3A showing the dog in a lower position removed from between the ends of the lock ring to permit it to assume its contracted position.

Split ring 19 has upper and lower sets of teeth 20 and 21, respectively, formed on its inner diameter, which are carried by the upper member 11 for radial movement together between an expanded, non locking position (FIG. 2) in which the split ends 19A of the ring are spaced a relatively larger distance apart (see FIG. 2A), and a contracted, locking position (FIG. 3) in which its ends are closer together (see FIG. 3A). More particularly, a skirt 22 which is mounted on the plate 16 has an inwardly extending flange 23 about its lower end on which the lower end of the lock ring 19 is supported with its upper teeth 20 generally opposite grooves 24 about the upper tubular member and its lower teeth 21 beneath the upper end of member 12. Thus, when expanded, the lower end of the lock ring will move past the upper end of member 12, to lower the seal surface on the pin into the seal surface on the box, and the conical end surface 11A into seated engagement on the conical end surface 12A, and thus locate the lower teeth opposite the lower grooves 25 about member 12.

As previously described, in the illustrated embodiment, the lock ring 19 is of such construction that, when unstressed, it assumes its expanded position, and is adapted to be moved from its expanded position of FIG. 2 to its contracted position of FIG. 3 by means of a cam ring 26 which surrounds the locking means. More particularly, the cam ring is vertically moveable within skirt 22 in order to force the lock ring 19 from its expanded to its contracted position, as the cam ring moves from its upper position of FIG. 2 to its lower position of FIG. 3, and to permit the lock ring to return to its expanded position of FIG. 2 as the cam ring is moved back to its upper position. The cam ring is held in its upper position, as shown in FIG. 2, by the expanded lock ring 19 whose resistance to contraction will support the weight of the cam ring until an external downward force is applied thereto, as will be described to follow.

The cam ring forces the lock ring inwardly to its contracted position by sliding downwardly over follower means about the lock ring. As shown, the cam ring includes upper and lower, radially displaced cam surfaces 27 having a tapered transition 29A therebetween, and the follower means includes upper and lower, radially displaced follower surfaces 28 having a tapered transition 29B therebetween. In the upper position of the cam ring 26, the lower cam surface surrounds the upper follower surface and tapered transition 29A is spaced a short distance above the upper end of the outer diameter of the lock ring, and the lower inner edge of the cam ring is just above transition 29B. As the cam ring begins to move downwardly, transition 29A slides downwardly over the upper outer edge of the locking ring and the lower inner edge of the cam ring slides downwardly over the transistion 29B to initially move the lock ring 19 radially inwardly at a high rate per unit of downward movement. Then, the upper and lower follower cam surfaces 27 on the cam ring move into position about the upper and lower follower surfaces 28 of the lock ring so as to continue to move the lock ring radially inwardly at a relatively low rate per unit of downward movement. Thus, the lock ring is forced into locking position with a relatively short vertical stroke of the cam ring to reduce the height of the overall connection. Also, and as previously mentioned, the taper of the cam and follower surfaces with respect to the vertical is less than the friction angle between them.

As shown in the drawings, each of the upper and lower locking teeth 20 and 21 have tapered sides which are slidable over similarly tapered sides of the matching profiles of the grooves 24 and 25. Thus, as the locking teeth move into locking engagement with the locking grooves, the conical pin 11A will flex inwardly to permit the annular shoulders 11B and 12B on the ends of the tubular members to be forced into tight engagement to preload the connection.

Figure 2A:
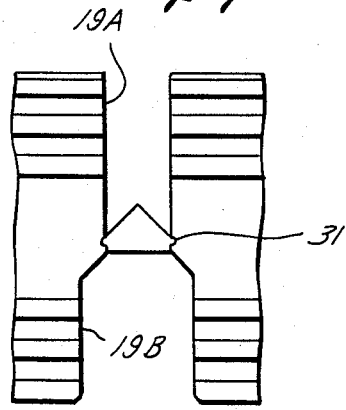

As best shown in FIGS. 2A and 3A, a dog or key 30 is carried on the inner side of the cam ring in vertical alignment with the split ends 19A of the lock ring. More particularly, the dog is so arranged lengthwise of the cam ring that it will move between the discontinuous ends 19A as the cam ring moves into its upper position relative to the lock ring. Thus, even if there is a tendency for the locking teeth to stick to the locking grooves, particularly after repeated use of the connector, the dog will spread the ends 19A apart in order to insure that the lock ring moves to expanded position. On the other hand, as the cam ring 20 moves into its lower position, dog 30 will be moved into recessed portions 19B of the split ends of the lock ring so as to permit the lock ring to be contracted as the cam ring is caused to slide downwardly over its outer surface.

For this purpose, the upper end of the dog has tapered surfaces for sliding over correspondingly tapered surfaces which connect the ends 19A with the recessed portions 19B. When the cam ring is moved to its upper position, and the dog 30 reaches the position shown in FIG. 2A, detents 31 on its opposite sides will move into grooves 32 formed in the ends 19A of the lock ring so as to releasably retain the cam ring in its upper position.

In an alternative embodiment of the invention, the lock ring 19, when unstressed, will assume its contracted, locking position. Thus, when cam ring 26 is in its raised position, as shown in FIG. 2A, dog 30 is disposed between the ends 19A of the lock ring to hold it in its expanded position. Then, as the cam ring is lowered, dog 30 moves into recessed portions 19B, as shown in FIG. 3A, to permit the lock ring to contract into interlocking relation with the teeth, and the cam ring to wedge the lock ring radially inwardly to preload the connection. Then, upon lifting of the cam ring, dog 30 is moved back between the split ends 19A of the lock ring to move it to and hold it in its expanded, unlocking position.

Plates 33 are connected to the outer side of cam ring 26 for lateral extension therefrom. As shown, there are a plurality of such plates 33, arranged circumferentially about the cam ring and extending through windows 35 in skirt 22. Thus, as previously mentioned, extendible and retractible actuators 36 may be disposed between the oppositely facing bearing surfaces of the intermediate plates 33 and the support plates 16 and 17 mounted on the members 11 and 12 above and below the intermediate plate for moving the cam ring to either its upper position or its lower position. Thus, as shown in solid lines in FIG. 3, when disposed between the upper bearing surfaces of intermediate plates 33 and the lower bearing surface of upper support plate 16, the actuators may be extended to force the cam ring downwadly to its lower position for moving the lock ring 19 into locking position. More particularly, the cam and follower surfaces are disposed at an angle to the vertical which is less than the friction angle therebetween, so that, when moved to its lower position, the cam ring will not be accidentally raised and thus will maintain the tubular members connected to one another upon removal of the actuators 36 for use in making up connections between additional riser pipes during lowering of the riser into the water.

Alternatively, during breaking out of the connections between successive riser pipes while raising the riser, the actuators 36 may instead be disposed between the lower bearing surfaces of the intermediate plates 33 and the upper bearing surface of the support plate 17, as shown in broken lines in FIG. 3, so that they may be extended to lift the cam ring to its upper position, as shown in FIG. 2, and thus permit the lock ring to expand in order to disconnect the tubular members. As previously described, if there is a tendency for the lock ring to remain stuck in its contracted position, it will be positively expanded by movement of the dog 30 upwardly between the ends 19A of the lock ring.

In the other embodiment of the invention, wherein the lock ring normally assumes a contracted position in locking engagement with the tubular members, the cam ring will not engage the follower means on the lock ring until the last stage of its downward movement, during which it will wedge the grooves on the locking ring over the teeth about the tubular members to preload the connection. On the other hand, when the cam ring is raised, the dog carried thereby will initially spread the ends of the contracted ring apart, and then hold the lock ring in expanded position when the cam ring has been lifted to its upper position. The lock ring and cam ring will be held in this latter position by the tight engagement of the split ends of the lock ring with the sides of the dog as well as by the above-described detent means.

Although the actuators may be of other types, they are preferably of a fluid-operated type to which pressure fluid may be supplied from a source on board the vessel, or from which such pressure may be exhausted back to the source. In any event, the actuators are preferably of such construction that they may be easily and quickly disposed between the loading surfaces, as previously described, and since they are not permanent parts of the overall apparatus, but merely auxiliary equipment for use therewith, only one set of them need be kept in stock for making up or breaking out any number of connections. Also, as previously noted, since, in both embodiments of the invention, the lock ring will remain in the position into which it is moved, the actuator will be removed for use at the other locations. Furthermore, even if the actuators were fixed parts of the overall apparatus, the fluid pressure therein could be relieved until such time that it was desired to move the lock ring back to its other position.

In the fabrication of lock ring 19, the teeth are preferably formed thereon to the same profile as the grooves about the tubular members before the ring is split, or at least before its ends are separated. The ring is then cut, if necessary, and, in the illustrated and first-described embodiments, its ends are spread to permanently deform it to its expanded position. In the other embodiment of the invention, the ends would not be spread to permanently deform the lock ring. In either case, however, the teeth on the lock ring would conform with the grooves of the tubular members in the contracted, locking position of the lock ring.

The inner diameter 37 of the flange on the lower end of the skirt 23 fits closely about the outer diameter of the second tubular member 12 when the members are in end-to-end relation. A tapered surface 38 on the lower side of the flange adjacent its inner diameter 37 will slide over the upper end of the lower tubular member to guide the members into coaxial relation, and the close fit of diameter 37 will maintain that alignment as the pin approaches the box. Also, the cylindrical sealing surface of the pin is guided into the box by the conical surface of the box during final movement of the tubular members into end-to-end relation. As will also be understood, this aligning of the ends of the tubular members is also useful in aligning the pipe ends 18A and 18B for fitting telescopically of one another.

In the alternative embodiment illustrated in FIGS. 4 and 5, the lock ring 40 is similar in many respects to the lock ring 19. Thus, its opposite ends 41A are, in its unstressed, unlocking position, spaced apart a relatively large amount. However, as compared with lock ring 19, the upper and lower locking teeth 42 and 43 are formed on circumferentially spaced-apart segments or jaws 44 mounted on the inner side of the lock ring 40. As will be understood from FIG. 5, upper and lower flanges on the jaws have slots which fit guidably over ridges on the upper and lower ends of the lockring 40.

The upper and lower teeth on the jaws are spaced axially apart for interlocking with the grooves in the tubular members. Also, the outer side of the lock ring 40 is provided with radially displaced follower surfaces 45 which correspond to the follower surfaces 28 of the locking means 19. Thus, they are connected by a transition 46, and are tapered at an angle with respect to the vertical which is less than the friction angle between the locking ring and the cam surfaces of the cam ring. Additionally, the spaced-apart ends 41A of the lock ring 40 would be so disposed that, upon raising of the cam ring with respect thereto, the dog or key 30 would move upwardly from recessed portions into the space between the ends 41A. Thus, in the case of the first-described embodiment, wherein the lock ring is normally expanded, the dog would positively expand the lock ring, and thus the jaw segments 44, in the event they should become stuck in locking engagement with the grooves about the tubular members. Alternatively, in the embodiment wherein the lock ring is normally contracted, the dog would hold it in expanded position. In either case, the lock ring 40 would have detent means for cooperation with detent means on the dog, as in the case of lock ring 19. Thus, as illustrated, the lock ring 40 is adapted to be physically interchanged with the lock ring 19, and, when so interchanged, to cooperate with the cam ring and with the locking grooves in the first and second tubular members in the same way described above with respect to lock ring 19.

Reviewing now the overall operation of the first-described embodiment of the connector, it will be assumed that tubular member 12 has been connected to a riser pipe 14 and the tubular member 11 connected to riser pipe 13, as shown, and that the member 12 and the riser pipe 14 are mounted at an upright position aboard the vessel, with the remainder of the riser depending therefrom into the water beneath the vessel. In order to connect on additional riser pipe 13 to the upper end thereof, and then continue to make up the riser as it is lowered further into the water, the tubular member 11, with the cam ring carried thereby in its upper position to permit the lock ring to expand, would be lowered into end-to-end relation with the lower tubular member 12. When the upper tubular membr has reached the position as shown in FIG. 2, the actuators 36 would be disposed between the plates 33 and the plate 16 and then extended so as to lower the cam ring to the position of FIG. 3, thereby moving the lock ring 19 inwardly into locking engagement with the tubular members. Then, the actuators 36 would be removed, and the riser pipe 13 lowered with the interconnected tubular members into a position on the vessel into a position in which a tubular member similar to member 12 may be connected to its upper end preparatory to the connection of a tubular member similar to member 11 on the lower end of the next upper riser pipe. Obviously, during raising the riser, the connectors between successive riser pipes would be disconnected by a reversal of this procedure.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interrupted as illustratiove and not in a limiting sense.

The invention having been described, what is claimed is:

1. A connector, comprising a first tubular member having first locking grooves thereabout, a second tubular member having second locking grooves thereabout, and a split lock ring having first and second axially spaced locking teeth on the inner side thereof which are carried by the first tubular member for radial movement together between expanded positions in which the first teeth are generally opposite the first grooves and the second teeth may be moved past the end of the second tubular member for disposal opposite the second grooves, when said members are moved into end-to-end relation, and contracted positions in which the first and second teeth are interlocked with the first and second grooves, respectively, said teeth having tapered surfaces thereon which are slidable over tapered surfaces of the grooves to urged end surfaces on said members into tight engagement with one another as the lock ring moves to contracted position, and a cam ring arranged about the lock ring for movement between a first position in which the lock ring is expanded and a second position in which the cam ring is slidable over follower means on the lock ring to wedge said lock ring into contracted position.

2. A connector of the character defined in claim 1, wherein the lock ring assumes its expanded position when unstressed, and, when so expanded, supports the cam ring in its first position, and the cam ring is slidable over the follower means on the lock ring as the cam ring moves from its first to its second position.

3. A connector of the character defined in claim 2, including a dog on the cam ring which enters the split between the ends of the lock ring to spread them apart as the cam ring moves into its first position.

4. A connector of the character defined in claim 3, wherein the dog and lock ring have detent means engageable to releasably retain the dog in spreading position as the cam ring moves into its first position.

5. A connector of the character defined in claim 1, wherein the lock ring assumes its contracted position when unstressed, and said cam ring has means thereon for expanding the lock ring as the cam ring moves to its first position.

6. A connector of the character defined in claim 5, wherein the means on the cam ring for expanding the lock ring comprises a dog which enters the split between the ends of the lock ring to hold them apart.

7. A connector of the character defined in claim 6, wherein the dog and lock ring have detent means engageable to releasably retain the dog in holding position as the cam ring moves into its first position.

8. A connector of the character defined in claim 1, wherein the follower means and cam ring include axially successive, radially displaced surfaces.

9. A connector of the character defined in claim 1, wherein the taper between the cam ring and follower means is less than the friction angle so that the lock ring is normally held in its contracted position.

10. A connector of the character defined in claim 1, wherein the teeth are formed on the inner surface of the lock ring.

11. A connector of the character defined in claim 1, wherein the locking teeth are formed on segments which are mounted about the inner side of the lock ring.

12. A connector of the character defined in claim 1, including a skirt carried by the first member to surround the lock ring and cam ring, and having an inwardly extending flange on which the lock ring is supported for radial movement.

13. A connector of the character defined in claim 12, wherein the inner diameter of the flange is adapted to fit closely about the second member, and the flange has a tapered surface adjacent its inner diameter to guide the skirt over the end of the second member.

14. A connector of the character defined in claim 1, including first and second bearing plates extending laterally from the first and second tubular members, respectively, and a bearing plate extending from the cam ring intermediate the first and second plates, whereby extendible and retractible actuators may be alternately arranged between the intermediate and each of the first and second bearing plates in order to selectively move the cam ring between its positions.

15. A riser pipe connector, comprising first and second tubular members each adapted to be connected to the end of a riser pipe, a first support plate extending laterally of the first member, a second support plate extending laterally of the second member, a pipe mounted on each plate for telescopically interfitting with a pipe mounted on the other plate, upon movement of the members into end-to-end relation, the first member having first locking grooves thereabout, the second member having second locking grooves thereabout, and a split lock ring having first and second axially spaced locking teeth on the inner side thereof which are carried by the first tubular member for radial movement together between expanded positions in which the first teeth are generally opposite the first grooves and the second teeth may be moved past the end of the second tubular member for disposal opposite the second grooves, when said members are in end-to-end relation, and contracted positions in which the first and second teeth are interlocked with the first and second grooves, respectively, said teeth having tapered surfaces thereon which are slidable over tapered surfaces of the grooves to urge end surfaces on the members into tight engagement with one another as the lock ring moves to contracted position, and a cam ring arranged about the lock ring for movement between a first position in which the lock ring is expanded and a second position in which the cam ring is slidable over follower means on the lock ring to wedge said lock ring into contracted position.

16. A connector of the character defined in claim 15, including a support plate extending laterally of the cam ring intermediate the support plates on the conduits, whereby extendible and retractible actuators may be alternately disposed between the support plate on the cam ring and the support plate on each tubular member in order to move said cam ring into one position or the other.

17. A connector of the character defined in claim 15, wherein the lock ring assumes its expanded position when unstressed, and, when so expanded, supports the cam ring in its first position, and the cam ring is slidable over the follower means on the lock ring as the cam ring moves from its first to its second position.

18. A connector of the character defined in claim 15, including a dog on the cam ring which enters the split between the ends of the discontinuous lock ring to spread them apart as the cam ring moves into its first position.

19. A connector of the character defined in claim 18, wherein the dog and lock ring have detent means engageable to releasably retain the dog in spreading position as the cam ring moves into its first position.

20. A connector of the character defined in claim 15, wherein the lock ring assumes its contracted position when unstressed, and said cam ring has means thereon for expanding the lock ring as the cam ring moves to its first position.

21. A connector of the character defined in claim 20, wherein the means on the cam ring for expanding the lock ring comprises a dog which enters the split between the ends of the lock ring to hold them apart.

22. A connector of the character defined in claim 21, wherein the dog and lock ring have detent means engageable to releasably retain the dog in holding position as the cam ring moves into its first position.

23. A connector of the character defined in claim 15, wherein the follower means and cam ring include axially successive, radially displaced surfaces.

24. A connector of the character defined in claim 15, wherein the taper between the cam ring and follower means is less than the friction angle so that the lock ring is normally held in its contracted position.

25. A connector of the character defined in claim 15, wherein the teeth are formed on the inner surface of the lock ring.

26. A connector of the character defined in claim 15, wherein the teeth are formed on segments which are mounted about the lock ring and on which the locking teeth are formed.

27. A connector of the character defined in claim 15, including a skirt carried by the first plate to surround the lock ring and cam ring, and having an inwardly extending flange on which the lock ring is supported for radial movement.

28. A connector of the character defined in claim 27, wherein the inner diameter of the flange is adapted to fit closely about the second member, and the flange has a tapered surface adjacent its inner diameter to guide the skirt over the end of the second member.

29. Apparatus for connecting a first conduit to a second conduit which has locking grooves thereabout near one end, comprising a tubular member adapted to be connected to the first conduit and having locking grooves thereabout near its free end, and a split lock ring having first and second axially spaced locking teeth which are carried by the tubular member for radial movement together between expanded positions in which the first teeth are generally opposite the grooves about the tubular member and the second teeth may be moved past the end of the second conduit for disposal opposite grooves thereabout, when said tubular member is moved into end-to-end relation with said second conduit, and contracted positions in which the first and second teeth are interlocked with the grooves on said tubular member and second conduit, respectively, said teeth having tapered surfaces thereon which are slidable over tapered surfaces of the grooves to urge an end surface on said member into tight engagement with an end surface on said second conduit as the lock ring moves to contracted position, and a cam ring arranged about the lock ring for movement between a first position in which the lock ring is expanded and a second position in which the cam ring is slidable over follower means on the lock ring to wedge said lock ring into contracted position.

30. Apparatus of the character defined in claim 29, wherein the lock ring assumes its expanded position when unstreassed, and, when so expanded, supports the cam ring in its first position, and the cam ring is slidable over the follower means on the lock ring as the cam ring moves from its first to its second position.

31. Apparatus of the character defined in claim 29, including a dog on the cam ring which enters the split between the ends of the discontinuous lock ring to spread them apart as the cam ring moves into its first position.

32. Apparatus of the character defined in claim 31, wherein the dog and lock ring have detent means engageable to releasably retain the dog in spreading position as the cam ring moves into its first position.

33. Apparatus of the character defined in claim 29, wherein the lock ring assumes its contracted position when unstressed, and said cam ring has means thereon for expanding the lock ring as the cam ring moves to its first position.

34. Apparatus of the character defined in claim 33, wherein the means on the cam ring for expanding the lock ring comprises a dog which enters the split between the ends of the lock ring to hold them apart.

35. Apparatus of the character defined in claim 34, wherein the dog and lock ring have detent means engageable to releasably retain the dog in holding position as the cam ring moves into its first position.

36. Apparatus of the character defined in claim 29, wherein the follower means and cam ring include axially successive, radially displaced segments.

37. Apparatus of the character defined in claim 29, wherein the taper between the cam ring and follower means is less than the friction angle so that the lock ring is normally held in its contracted position.

38. Apparatus of the character defined in claim 29, wherein the teeth are formed on the inner surface of the lock ring.

39. Apparatus of the character defined in claim 29, wherein the teeth are formed on segments which are mounted about the inner surface of the lock ring.

40. Apparatus of the character defined in claim 29, including a skirt carried by the first member to surround the lock ring and cam ring, and having an inwardly extending flange on which the lock ring is supported for radial movement.

41. Apparatus of the character defined in claim 40, wherein the inner diameter of the flange is adapted to fit closely about the conduit, and the flange has a tapered surface adjacent its inner diameter to guide the skirt over the end of the conduit.

42. A connector, comprising a first tubular member having at least one first locking groove thereabout, a second tubular member having at least one second locking groove thereabout, and a split lock ring having first and second axially spaced locking teeth on the inner side thereof which are carried by the first tubular member for radial movement together between expanded positions in which the first teeth are generally opposite the first groove and the second teeth may be moved past the end of the second tubular member for disposal opposite the second groove, when said members are moved into end-to-end relation, and contracted positions in which the first and second teeth are interlocked with the first and second grooves, respectively, said teeth having tapered surfaces thereon which are slidable over tapered surfaces of the grooves to urge end surfaces on said members into tight engagement with one another as the lock ring moves to contracted position, said lock ring assuming its contracted position, when unstressed, and a cam ring arranged about the lock ring for movement between a first position in which the lock ring is expanded and a second position in which the cam ring is contracted, said cam ring having a dog carried thereon which enters the split between the ends of the lock ring to spread apart, and thereby maintain the lock ring in its expanded position, as the cam ring moves into its first position.

43. A connector of the character defined in claim 42, wherein the dog and lock ring have detent means engageable to releasably retain the dog in spreading position as the cam ring moves into its first position.

44. A connector of the character defined in claim 42, wherein the follower means and cam ring include axially successive, radially displaced surfaces.

45. A connector of the character defined in claim 42, wherein the taper between the cam ring and follower means is less than the friction angle so that the lock ring is normally held in its contracted position.

46. A connector of the character defined in claim 42, including a skirt carried by the first member to surround the lock ring and cam ring, and having an inwardly extending flange on which the lock ring is supported for radial movement.

47. A riser pipe connector, comprising first and second tubular members each adapted to be connected to the end of a riser pipe, a first support plate extending laterally of the first member, a second support plate extending laterally of the second member, a pipe mounted on each plate for telescopically interfitting with a pipe mounted on the other plate, upon movement of the members into end-to-end relation, the first member having at least one first locking groove thereabout, the second member having at least one second locking groove thereabout, and a split lock ring having first and second axially spaced locking teeth on the inner side thereof which are carried by the first tubular member for radial movement together between expanded positions in which the first tooth is generally opposite the first groove and the second tooth may be moved past the end of the second tubular member for disposal opposite the second groove, when said members are in end-to-end relation, and contracted positions in which the first and second teeth are interlocked with the first and second grooves, respectively, said teeth having tapered surfaces thereon which are slidable over tapered surfaces of the grooves to urge end surfaces on the members into tight engagement with one another as the lock ring moves to contracted position, said lock ring assuming its contracted position, when unstressed, and a cam ring arranged about the lock ring for movement between a first position in which the lock ring is expanded and a second position in which the cam ring is contracted, said cam ring having a dog carried thereon which enters the split between the ends of the discontinuous lock ring to spread them apart, and thereby maintain the lock ring in its expanded position, as the cam ring moves into its first position.

48. A connector of the character defined in claim 47, including a support plate extending laterally of the cam ring intermediate the support plates on the conduits, whereby extendible and retractible actuators may be alternately disposed between the support plate on the cam ring and the support plate on each tubular member in order to move said cam ring into one position or the other.

49. A connector of the character defined in claim 47, wherein the dog and lock ring have detent means engageable to releasably retain the dog in spreading position as the cam ring moves into its first position.

50. A connector of the character defined in claim 47, wherein the follower means and cam ring include axially successive, radially displaced surfacess.

51. A connector of the character defined in claim 47, wherein the taper between the cam ring and follower means is less than the friction angle so that the lock ring is normally held in its contracted position.

52. A connector of the character defined in claim 47, including a skirt carried by the first plate to surround the lock ring and cam ring, and having an inwardly extending flange on which the lock ring is supported for radial movement.

53. A connector of the character defined in claim 52, wherein the inner diameter of the flange is adapted to fit closely about the second member, and the flange has a tapered surface adjacent its inner diameter to guide the skirt over the end of the second member.

54. Apparatus for connecting a first conduit to a second conduit which has at least one locking groove thereabout near one end, comprising a tubular member adapted to be connected to the first conduit and having at least one locking groove thereabout near its free end, and a split lock ring having first and second axially spaced locking teeth which are carried by the tubular member for radial movement together between expanded positions in which the first tooth is generally opposite the grooves about the tubular member and the second tooth may be moved past the end of the second conduit for disposal opposite the groove thereabout, when said tubular member is moved into end-to-end relation with said second conduit, and contracted positions in which the first and second teeth are interlocked with the grooves on said tubular member and second conduit, respectively, said teeth having tapered surface thereon which are slidable over tapered surfaces of the grooves to urge an end surface on said member into tight engagement with an end surface on said second conduit as the lock ring moves to contracted position, said lock ring assuming its expanded position, when unstressed, and a cam ring arranged about the lock ring for movement between a first position in which the lock ring is expanded and a second position in which the cam ring is contracted, said cam ring having a dog carried thereon which enters the split between the ends of the lock ring to spread them apart, and thereby maintain the lock ring in expanded position, as the cam ring moves into its first position.

55. A connector of the character defined in claim 54, wherein the dog and lock ring have detent means engageable to releasably retain the dog in spreading position as the cam ring moves into its first position.

56. A connector of the character defined in claim 54, wherein the follower means and cam ring include axially successive, radially displaced surfaces.

57. A connector of the character defined in claim 54, wherein the taper between the cam ring and follower means is less than the friction angle so that the lock ring is normally held in its contracted position.

58. A connector of the character defined in claim 54, including a skirt carried by the first member to surround the lock ring and cam ring, and having an inwardly extending flange on which the lock ring is supported for radial movement.

59. A connector of the character defined in claim 58, wherein the inner diameter of the flange is adapted to fit closely about the conduit, and the flange has a tapered surface adjacent its inner diameter to guide the skirt over the end of the conduit.

* * * * *